April 18, 1933.  F. L. JOHNSON  1,904,945
COLLAPSIBLE TIRE BUILDING FORM
Filed Sept. 10, 1930   4 Sheets-Sheet 1

INVENTOR
FRANK L. JOHNSON

BY

ATTORNEYS

April 18, 1933. F. L. JOHNSON 1,904,945
COLLAPSIBLE TIRE BUILDING FORM
Filed Sept. 10, 1930 4 Sheets-Sheet 2

INVENTOR
Frank L. Johnson
BY
Ely & Barrow
ATTORNEYS

April 18, 1933.　　F. L. JOHNSON　　1,904,945
COLLAPSIBLE TIRE BUILDING FORM

Filed Sept. 10, 1930　　4 Sheets-Sheet 3

INVENTOR
Frank L. Johnson

BY

ATTORNEYS

INVENTOR
FRANK L. JOHNSON

Patented Apr. 18, 1933

1,904,945

UNITED STATES PATENT OFFICE

FRANK L. JOHNSON, OF AKRON, OHIO

COLLAPSIBLE TIRE BUILDING FORM

Application filed September 10, 1930. Serial No. 480,955.

The present invention relates to the construction of collapsible tire building forms and particularly to tire building cores in which mechanism is provided for withdrawing and removing the several sections of the core or form from the interior of the completed tire carcass.

It is the object of the present invention to devise and perfect a collapsing mechanism or organization in which the maximum collapsing effect can be secured. The purpose of the device is to enable a core of this type to be used economically and effectively with tires of very large cross section and small bead diameters.

The combination herein shown provides a new and improved means of withdrawing the key section so that it is moved to a greater distance and thereby cleared of the beads as the first movement of the stripping operation. The invention further contemplates the combination of a group of interconnected sections constituting the main portion of the core body, with a special mounting for a single or key section by which the latter may be withdrawn from the complete circular assembly to a position well within the internal bead diameter.

The invention has as a further object a new and novel collapsing mechanism which will be described in detail, and which has advantages and improvements over prior designs of collapsing mechanism.

It will be observed that the invention is shown in its best known or preferred form and as a collapsible core, but the invention may be extended to drums or forms generally for use in tire building operations, it being understood that the word "core" is employed herein to cover any type of tire building form. It will also be noted that principles of the invention may be used and employed in a variety of ways and the invention may be modified or improved upon within the scope thereof.

Figure 1:
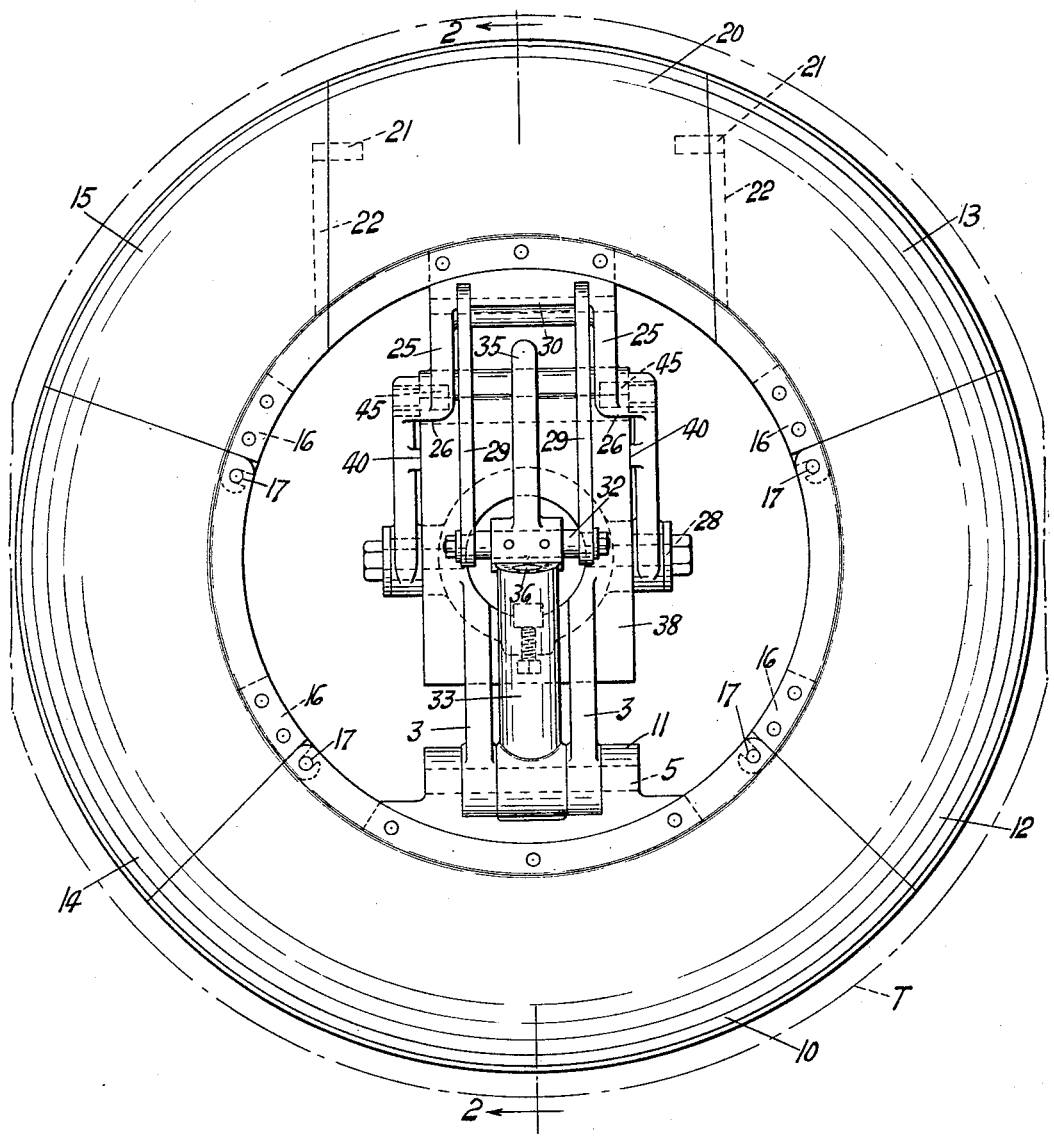
Figure 1 is a side view of a collapsible core complete and in fully assembled condition.
Figure 2:
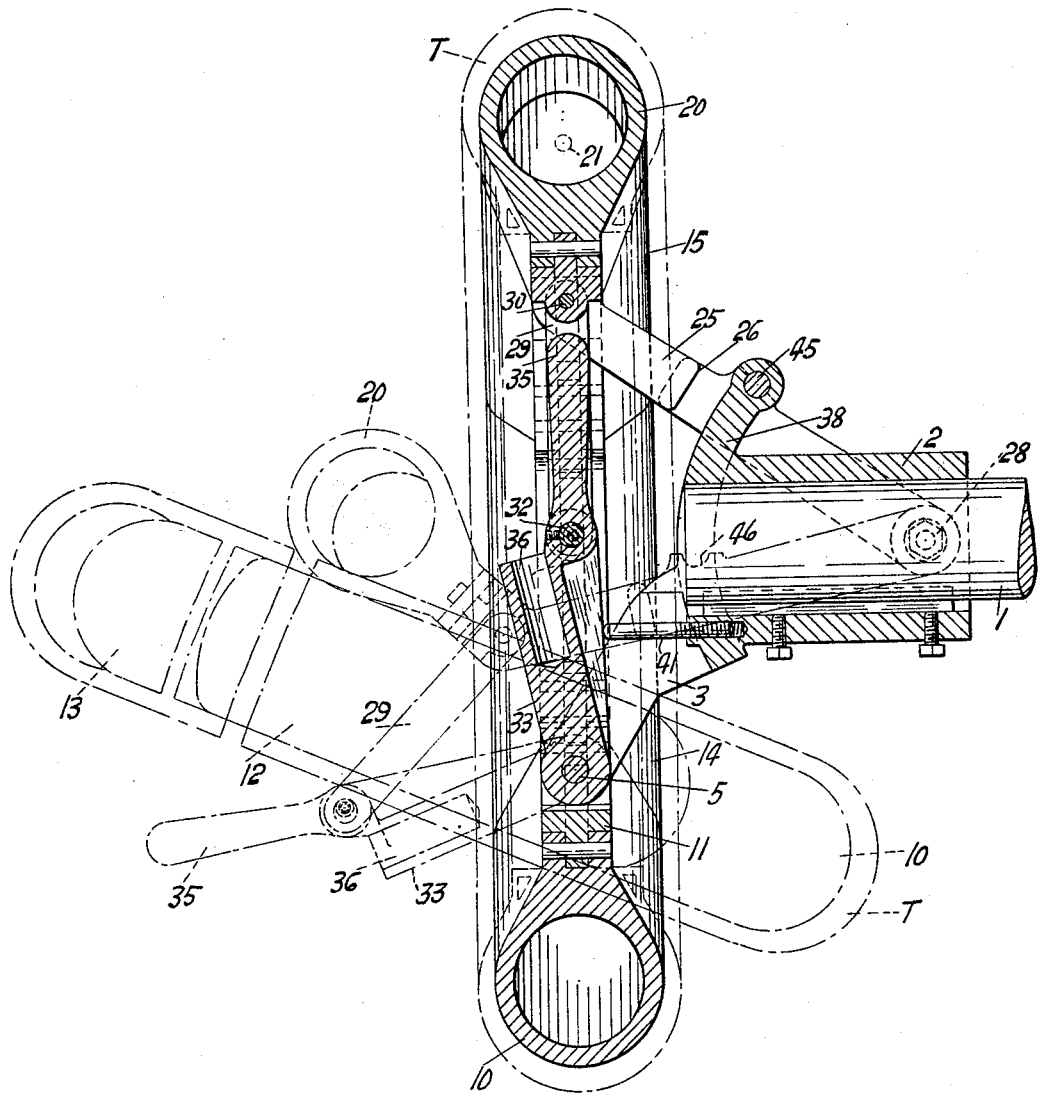
Figure 2 is a cross section of the core taken on the line 2—2 of Figure 1, the dotted lines indicating the core in partially collapsed condition.

The collapsible core or form is mounted upon the shaft 1 of a tire building machine or stand which may be rotated by any suitable mechanism as is customary in the art of tire building. To the end of the shaft is keyed the supporting sleeve which is desirably adjustable longitudinally of the shaft for the purpose of centering or locating the core with respect to stitching or tire forming mechanisms which are employed with these machines.

From the forward end of the sleeve 2 extend the parallel supporting arms 3 which are projected laterally and downwardly as shown and which support the hinge pin 5 upon which the main body or group of core sections is supported.

The main body of the core is composed of a plurality of sections which are pivoted above the pin 5 so that they can be erected in the vertical position in which they are located while in circular form, or on which they can be moved to a position outside of the plane of the core for collapsing purposes. This group of sections may be of any suitable or desirable number depending upon the size of the core and the necessity for providing a multiplicity of sections for collapsing. As illustrated herein, the group of sections is composed of a central section 10 which is provided with the hinge plate 11 receivable over the hinge pin 5. To one end of the central section are arranged the two intermediate sections 12 and 13 and to the other side the intermediate sections 14 and 15. These sections may all be hinged together and the hinges may be straight or oblique as desired. Or, as shown in the drawings, detachable connections may be employed such as the hook plates 16 engaging pin 17 in the next adjacent sections. In any event, the group of sections is interconnected in such manner that it may be collapsed in the easiest or most expeditious way required by the tire builder.

The key section which lies within the gap in the group of sections is noted by the numeral 20 and is provided with some projecting or interlocking key devices such as the pins 21 which engage the slots 22 in the ends of the sections 13 and 15, respectively, for alignment and locking of the core in assembled position. Attached to the inner web or tongue of the key section is the end of an arm 25 which is curved immediately below the key section and extended rearwardly, being bifurcated and bent as at 26 so as to pass on opposite sides of the sleeve 2. The inner ends of the arms are pivoted as at 28 to the sleeve, so that the key section is moved in an arc about the points 28. It will be observed that, as these points are at a considerable distance to the rear of the core plane, the key section will move in an arc which extends forwardly of the core plane. By mounting the key section in the manner described, it may be moved to a position well down in the core and it is thus possible to move a section of very large cross section well within the inner bead diameter. This makes it possible to strip very bulky cores without danger of interference between the key section and any supporting or collapsing mechanisms. It will also be observed that as the key section is rigidly attached to the arms 25, in its forward or inward movement, it will tilt forwardly and this tilting assists in the stripping operation. Due to the design of the key section supporting means, that portion of the core is located in such position that it does not interfere with the stitcher mechanism usually employed in conjunction with tire building cores or forms.

In order to rock the arm 25 about its pivot, any desirable lever mechanism or power device may be employed. In the form shown herein a toggle link device is shown, comprising a pair of parallel links 29, pivotally carried upon a cross pin 30 mounted in the arm 25 near the key section. The links 29 are connected by the pin 32 to a link 33 which is in turn pivoted upon the hinge pin 5. The link 33 is an operating lever, being provided with an extension in the form of a handle 35, which, when the core is erected, lies between the links 29. In order to provide greater power for breaking the core down, the link 32 may be provided with a socket 36 in which a crow bar or lever may be inserted.

To guide the key section in its movement to and from its operative or erected position, the sleeve 2 may be formed with an arc-shaped track or guide 38 and the inner sides of the arms with wear plates 40 which are movable along the sides of the guide. An adjustable pin 41 may be inserted in the sleeve 2 to operate as a rear stop to limit the movement of the toggle lever, and this pin may be adjusted so that the centers of movement of the toggles are slightly past center when the core is erected. The pin 32 may also be provided with an eccentric central portion for the link 33 and may be rotatively adjusted to take up the wear in the mechanism. Stop pins 45 may be located in the ends of the tracks against which seats 46 in the arm may rest when the core is erected.

Figure 3:
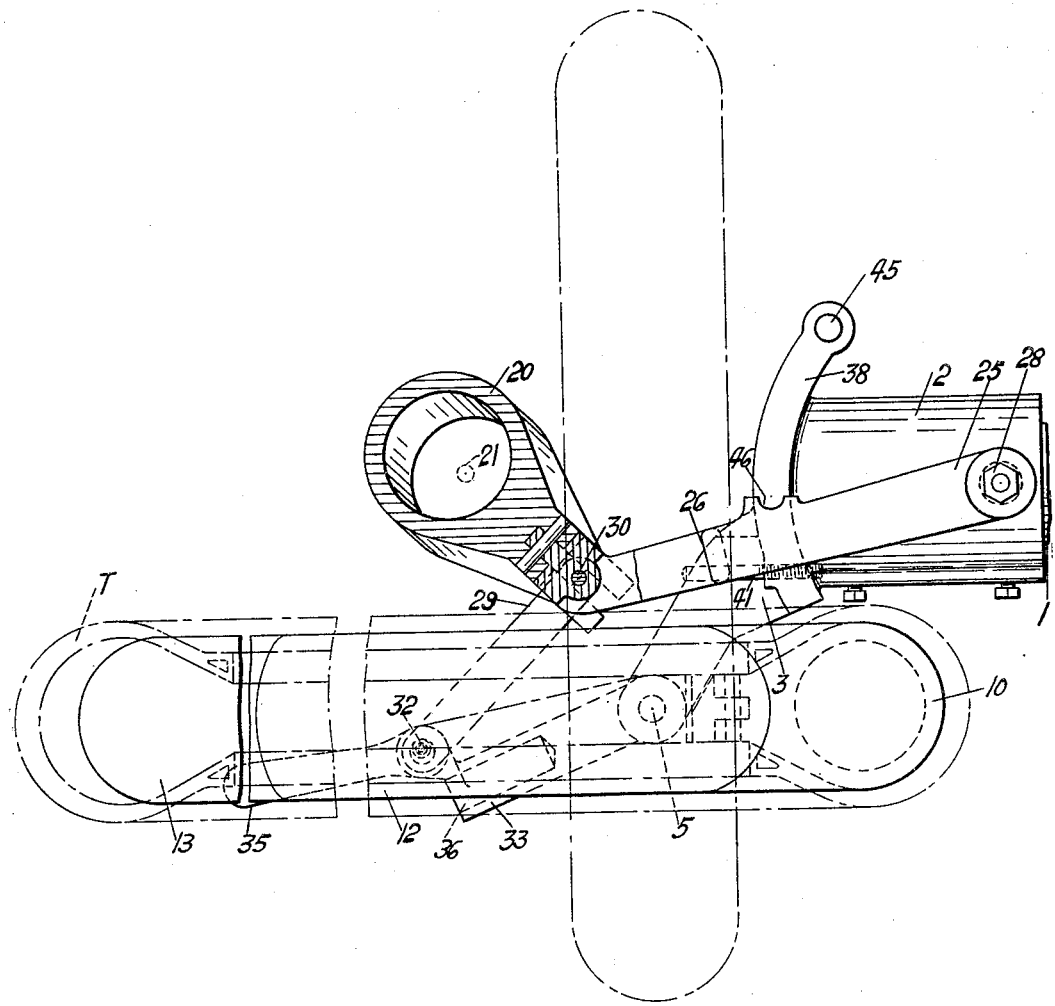
Figure 3 is a cross section showing the group of interconnected sections in the horizontal position.
Figure 4:
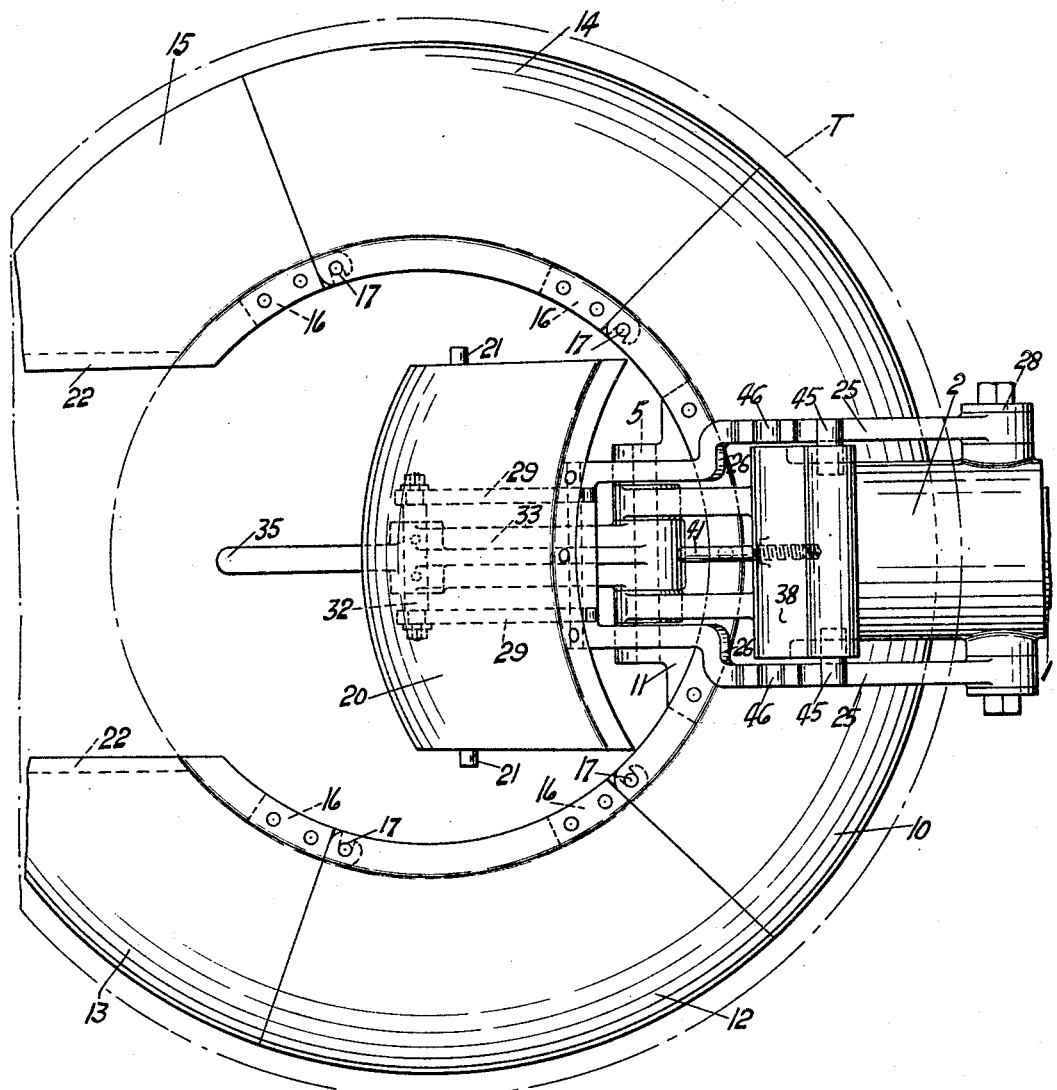
Figure 4 is a plan view of the parts in the same condition as in Figure 3.

In the operation of the device, and assuming that a tire has been built upon the core, as shown at the dotted lines T, the key section is withdrawn by the rocking of the arm about the centers 28, moving the key section forwardly as shown in dotted lines. The forward movement of the key section will also initiate the forward rocking of the group of sections, about the hinge pin 5. This will start the second step in the operation of stripping which is the movement of the group of sections to horizontal position, which may be readily accomplished as the key section is now withdrawn completely within the inner bead diameter. When the core is in the condition shown in Figure 3, the key section is moved to its vertical position so that it and its operating mechanism is out of the central opening of the tire. The group of sections is now collapsed and removed from the tire in the manner required by its construction, either by swinging or detaching the end sections.

Among the advantages of the present combination are the features that the key section is given a very extensive path of movement so that the full center opening may be utilized for the withdrawal of this section. The movement of the key section being in the same general direction as the group movement, the withdrawal of this section operates through the tire and the pin and slot 21-22 to rock the group and this assists in the withdrawal of the key section. This connection will release itself during the rocking movement. The operator is not required to move the group as far in the second step of the stripping operation, thus saving the wear and breakage upon the mechanism. The inner circle of the tire is utilized to its full extent and thus very bulky cores may be stripped easily and effectively. The tilting forwardly of the key section, due to its rigid connection with the pivoted arm 25, serves to strip the key section from the tire more readily.

These and other advantages and points of superiority will be evident to those skilled in this art and it will be appreciated that many changes may be made in the specific embodiments of the invention.

In reerecting the core after the stripping operation, the reverse order of movements will restore the core to its fully operative position.

What is claimed is:—

1. In a collapsible tire building core, the combination of a key section and a group of sections constituting a complete core, an arm rigidly connected to the key section and movable about a pivot in the rear of the core plane, the group of sections being pivoted to swing as a group about a pivot on one side of the core axis.

2. In a collapsible tire building core, the combination of a key section and a group of sections constituting a complete core, an arm supporting the key section and movable about a pivot in the rear of the plane of the core, the group of sections being pivoted to swing as a group into a position outside of the original core plane.

3. In a collapsible tire building core, the combination of a key section and a group of sections constituting a complete core, and an arm supporting the key section and movable about a pivot in the rear of the plane of the core, the group of sections being pivoted to swing as a group about a pivot at one side of the axis of the core into a position outside of the original core plane.

4. In a collapsible tire building core, the combination of a key section and a group of sections constituting a complete core, an arm rigidly attached to the key section and movable about a pivot in the rear of the plane of the core, the group of sections being pivoted to swing as a group into a position outside of the original core plane.

5. In a collapsible tire building core, the combination of a key section and a group of sections constituting a complete core, and an arm rigidly attached to the key section and movable about a pivot in the rear of the plane of the core, the group of sections being pivoted to swing as a group about a pivot at one side of the axis of the core into a position outside of the original core plane.

6. In a collapsible tire building core, the combination of a key section and a group of sections constituting a complete core, a core support, an arm attached to the key section and having a rearwardly and obliquely extending portion pivotally connected to the core support, and a pivot for the group of sections about which the group is movable to a plane at an angle to the original core plane.

7. In a collapsible tire building core, the combination of a key section pivotally mounted to swing forwardly of the core plane, a pivoted group of sections mounted to swing forwardly about a second pivot, and an operating mechanism to move the key section forwardly, and a connection between the key section and the group of sections for moving the latter forwardly upon forward movement of the key section, said connection being releasable during the joint pivotal movement.

8. In a collapsible tire building core, the combination of a key section pivotally mounted to swing forwardly about a center at the rear of the core plane, a pivoted group of sections mounted to swing forwardly about a second pivot, a common operating mechanism to move both the key section and the group of sections forwardly, and a connection between the key section and the group of sections which is releasable during the joint pivotal movement.

9. In a collapsible tire building core, the combination of a key section pivotally mounted to swing forwardly of the core plane, a pivoted group of sections mounted to swing forwardly about a second pivot, and an operating mechanism to move the key section forwardly and means interconnecting the key section and the group of sections to move the latter forwardly upon movement of the key section forwardly.

10. In a collapsible tire building core, the combination of a key section pivotally mounted to swing forwardly about a center at the rear of the core plane, a pivoted group of sections mounted to swing forwardly about a second pivot, and a common operating mechanism to move both the key section and the group of sections forwardly.

11. In a collapsible tire building core, a key section and a group of sections constituting the complete core, an arm connected to the key section and extended rearwardly of the core, a pivot for the arm located rearwardly of the core, a pivot for the group of sections, and a toggle connected to the key section and to the pivot for the group of sections.

12. In a collapsible tire building core, a key section and a group of sections constituting the complete core, an arm connected to the key section, a pivot for the arm, a pivot for the group of sections, and a toggle connected to the key section and to the pivot for the group of sections.

FRANK L. JOHNSON.